US007188591B2

(12) United States Patent
Long

(10) Patent No.: US 7,188,591 B2
(45) Date of Patent: Mar. 13, 2007

(54) POWER SUPPLY METHOD FOR ELECTRICAL EQUIPMENT

(75) Inventor: Marc Long, Paris (FR)

(73) Assignee: Johnson Controls Automotive Electronics, Osny (FR)

( * ) Notice: Subject to any disclaimer, the term of this patent is extended or adjusted under 35 U.S.C. 154(b) by 375 days.

(21) Appl. No.: 10/480,579

(22) PCT Filed: Jun. 13, 2002

(86) PCT No.: PCT/FR02/02027

§ 371 (c)(1), (2), (4) Date: Dec. 12, 2003

(87) PCT Pub. No.: WO02/103729

PCT Pub. Date: Dec. 27, 2002

(65) Prior Publication Data

US 2004/0154563 A1 Aug. 12, 2004

(30) Foreign Application Priority Data

Jun. 15, 2001 (FR) .................................. 01 07855

(51) Int. Cl.

*H01H 47/32* (2006.01)
*F01L 9/04* (2006.01)
*F02D 41/20* (2006.01)
*H02M 3/335* (2006.01)

(52) U.S. Cl. .................... 123/90.11; 123/490; 363/16; 361/156

(58) Field of Classification Search .................. 363/16, 363/17, 59, 60, 73, 74; 123/90.11, 490; 361/152, 361/153, 154, 155, 156, 160, 18; 307/10.1, 307/109; 323/266, 267, 282

See application file for complete search history.

(56) References Cited

U.S. PATENT DOCUMENTS

| | | | | |
|---|---|---|---|---|
| 4,360,852 | A * | 11/1982 | Gilmore | 361/18 |
| 5,805,433 | A * | 9/1998 | Wood | 363/16 |
| 5,975,057 | A | 11/1999 | Repplinger et al. | |
| 6,084,789 | A * | 7/2000 | Van Lieshout | 363/60 |
| 6,151,222 | A * | 11/2000 | Barrett | 363/16 |
| 6,798,177 | B1 * | 9/2004 | Liu et al. | 323/282 |
| 2003/0010325 | A1 * | 1/2003 | Reischl et al. | 123/490 |

FOREIGN PATENT DOCUMENTS

| | | | |
|---|---|---|---|
| DE | 3245759 | A1 * | 6/1984 |
| FR | 2 766 005 | A1 | 1/1999 |
| FR | 2 803 956 | A1 | 7/2001 |

* cited by examiner

*Primary Examiner*—Willis R. Wolfe, Jr.
(74) *Attorney, Agent, or Firm*—Foley & Lardner LLP

(57) ABSTRACT

A power supply method an apparatus for powering electrical equipment, the electrical equipment operated by using current peaks. The electrical equipment may be connected via at least one capacitive element to a voltage converter which may be connected to a storage battery. The voltage converter may be current-regulated from a reference current. The reference current may correspond to an average current between two peaks (generally corresponding to one cycle of operation). The reference current may be calculated in a predictive manner and the reference current may include a correction factor. The voltage output from the voltage converter may be maintained between an upper limit and a lower limit.

26 Claims, 1 Drawing Sheet

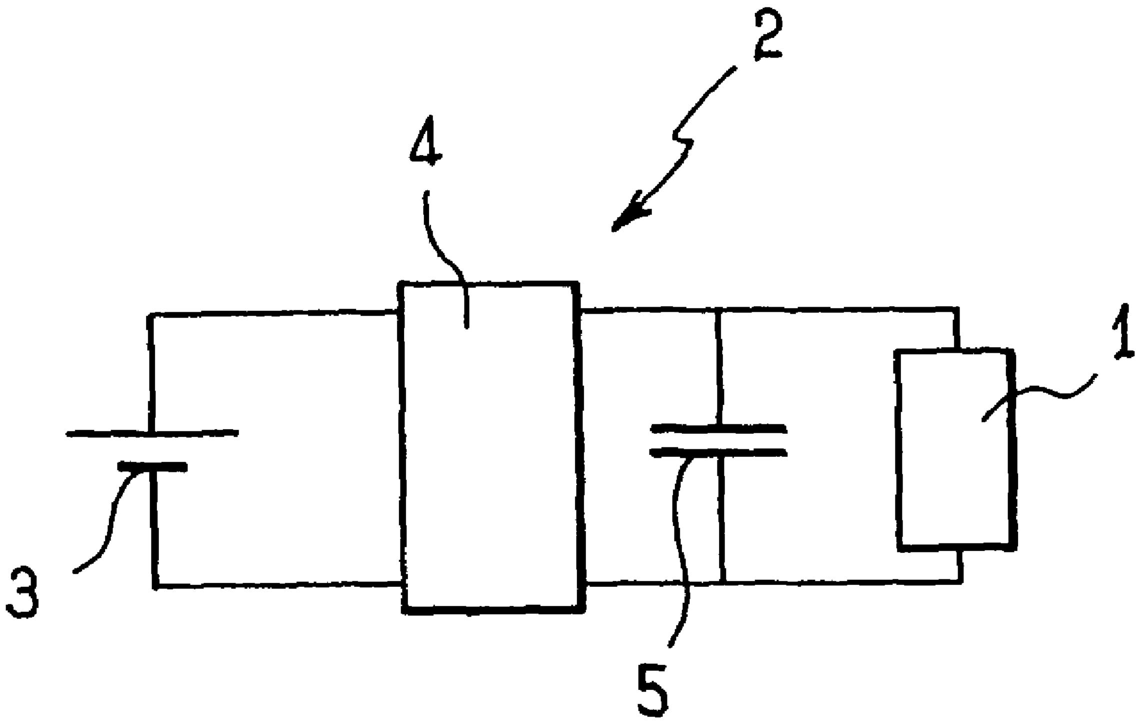
2
4
1
3
5

POWER SUPPLY METHOD FOR ELECTRICAL EQUIPMENT

FIELD

The present application relates to a method of powering electrical equipment such as an electromagnetic actuator suitable for use in particular in actuating valves in the engines of motor vehicles.

BACKGROUND

Such an electromagnetic actuator is incorporated in a power supply network in which it is connected via a capacitive element to a voltage converter which is itself connected to a storage battery and to an alternator and which is voltage-regulated and current-limited.

In a network of this type, operating the electromagnetic actuator gives rise to current being drawn from the network at the outlet of the voltage converter, with this effect being transferred to the inlet of the voltage converter. This gives rise to current peaks of characteristics which are incompatible with the response time of the alternator, such that the alternator cannot deliver the necessary current, so the current is taken from the storage battery. Unfortunately, these high-amplitude current peaks cause the storage battery to become heated, thus making standard batteries relatively unsuitable for such use.

It might be thought that such current peaks could be filtered by increasing the capacitance associated with the voltage converter. Unfortunately, given the amplitude and the duration of such peaks, such filtering would require capacitors of large volume in order to be effective. It would also be possible to use a storage battery having low internal resistance or an alternator having a short response time. Such elements are nevertheless relatively expensive.

SUMMARY

One embodiment provides means that are inexpensive and effective for powering such electrical equipment optimally.

To this end, the embodiment provides a power supply method for powering electrical equipment operating on current peaks and connected via at least one capacitive element to a voltage converter connected to a storage battery, the voltage converter being current-regulated from a reference current corresponding to a mean current between two peaks.

Thus, current regulation of the voltage converter which is controlled in this way as a current generator enables a substantially constant value to be maintained for the current delivered by the storage battery to the input of the voltage converter. This makes it possible to minimize the volume of the capacitive element.

In a particular implementation, the mean current is evaluated in predictive manner on the basis of actuator control data.

The reference current is thus obtained in anticipation. This mode of calculation makes it possible to obtain the reference current in simple manner and to avoid using as the reference a current as measured periodically, which would require regulation to be fast and would require high capacitance in order to act as a supply of energy in the event of a sudden change in current.

In which case, the reference current is advantageously equal to the evaluated mean current plus a correction factor for a voltage at the output from the converter which is rising and less than an upper voltage limit, and the reference current is equal to the evaluated mean current minus the correction factor for a voltage at the output of the converter which is falling and greater than a lower voltage limit.

The correction factor is determined in such a manner that the current input to the converter is maintained within a determined range that is compatible with the characteristics of the storage battery and the voltage at the output from the converter is maintained in a determined range compatible with the characteristics of the equipment. This enables the frequency with which the reference is calculated to be limited.

Also advantageously, the correction factor corresponds to inaccuracy in the evaluation of the mean current and is preferably equal to about 10% of the evaluated mean current.

The correction factor serves to compensate for any differences between the evaluated mean current and the mean current as actually consumed. The correction factor thus enables a mean current range to be determined which has a very high chance of including the value of the mean current as actually consumed.

Other characteristics and advantages of the invention appear on reading the following description of a particular and non-limiting implementation of the invention and upon review of the claims.

BRIEF DESCRIPTION OF THE DRAWING

Reference is made to the sole accompanying FIGURE which is a diagram of a power supply network used for powering electrical equipment.

MORE DETAILED DESCRIPTION

In this case, the method is intended for powering an electromagnetic actuator suitable for actuating valves of a motor vehicle engine. Such an actuator has electromagnetic coils which, when excited, attract an armature secured to at least one valve in order to bring the valve into an open position or a closed position and hold it in position. The current needed for exciting the coils must be delivered to them in the form of peaks of large amplitude and short duration at an excitation frequency which is determined by a vehicle controller which determines the current to be fed to the actuator as a function of control data such as the extent to which an accelerator pedal is depressed, the speed at which the engine is running, the speed of the vehicle, and more generally engine load parameters.

With reference to the FIGURE, the electromagnetic actuator 1 is connected to a power supply circuit 2 which comprises a storage battery 3 connected to a voltage converter 4. The battery 3 delivers a voltage of about 12 volts (V) and it is connected to an alternator (not shown) in order to be recharged. The voltage converter 4 is arranged to convert the input voltage of 12 V to an output voltage of about 42 V.

The voltage converter 4 is connected to the electromagnetic actuator 1 via a capacitive element 5 arranged to store the energy delivered by the voltage converter 4.

The method consists in current regulating the voltage converter 4 on the basis of a reference current corresponding to a mean current between two peaks.

The mean current is evaluated in predictive manner on the basis of the voltage on the storage battery 3 and the peak power that is to be consumed over a predetermined cycle duration. This power depends on the engine speed which can be deduced from the actuator control data used by the vehicle controller.

The voltage converter controlled in this way thus forms a current generator which is servo-controlled to the mean power which is about to be consumed during the following engine cycle.

Regulation is implemented conventionally by modulating the voltage at the input to the converter as a function of the current measured at the output from the converter.

The voltage at the output from the converter is also measured, and is delivered to the controller for use when determining the reference current to apply a correction factor to the evaluated mean current.

The reference current is thus equal to the evaluated mean current plus a correction factor for a voltage at the output from the converter which is rising and which is less than an upper limit voltage, and the reference current is equal to the evaluated mean current minus the correction factor for a voltage at the output of the converter which is falling and which is greater than a lower voltage limit.

This correction factor corresponds to uncertainty concerning the instant at which the next current peak will appear, i.e. to a possible difference between the evaluated mean current and the mean current actually consumed. The correction factor is equal to about 10% the evaluated mean current.

Because the voltage converter is controlled as a current generator, the voltage at the output from the converter varies. It should be observed that since the actuator is current-driven, variations in voltage are of little consequence. Nevertheless, these variations are set within the range defined by the lower and upper voltage limits. These limits are determined so that the corresponding voltage range is compatible with the characteristics of the actuator. By way of example, if the characteristics of the actuator allow it to be operated with voltages in the range 30 V to 50 V, then a lower limit is selected to be equal to about 34 V and an upper limit is set to be equal to about 44 V.

Naturally, the invention is not limited to the implementation described and variant implementations can be devised without going beyond the ambit of the invention as defined by the claims.

In particular, the reference may be calculated on the basis of a current that is measured periodically.

Although the correction factor is equal to 10% in the example described, its value could be different. It is also possible to do without a correction factor.

In addition, the lower and upper voltage limits can also be modified, and in particular they can be closer together or further apart as a function of the characteristics of the equipment to be powered.

Furthermore, the invention is not limited to powering an electromagnetic actuator, but can be used for powering any electrical equipment that operates in pulsed mode. For example, the invention may be applied to a system for flashing vehicle headlights.

The invention claimed is:

1. A power supply method for powering electrical equipment operating on current peaks and connected via at least one capacitive element to a voltage converter connected to a storage battery, wherein the voltage converter is current-regulated from a reference current corresponding to a mean current between two peaks.

2. A power supply method according to claim 1, wherein the mean current is evaluated in predictive manner from control data for the equipment.

3. A power supply method according to claim 2, wherein the reference current is equal to the evaluated mean current plus a correction factor for a voltage at the output from the converter (4) which is rising and less than an upper voltage limit, and the reference current is equal to the evaluated mean current minus the correction factor for a voltage at the output of the converter (4) which is falling and greater than a lower voltage limit.

4. A power supply method according to claim 3, wherein the correction factor corresponds to inaccuracy in the evaluation of the mean current.

5. A power supply method according to claim 4, wherein the correction factor is equal to about 10% of the evaluated mean current.

6. A system for powering an electrical device operating on current peaks in a vehicle having a battery, the system comprising:

a voltage converter configured to be coupled to the battery of the vehicle;

an electromagnetic engine valve actuator configured to be located in the vehicle and configured to receive power from the voltage converter; and a capacitive element connecting the electrical device and the voltage regulator;

wherein the voltage converter is regulated such that power may be drawn from the battery in a manner compatible with the properties of the battery.

7. The system of claim 6, wherein current to be provided to the voltage converter is determined in a predictive manner.

8. The system of claim 6, wherein current to be provided to the voltage converter is determined based on an average amount of power used by the electromagnetic engine valve actuator.

9. The system of claim 6, wherein the voltage output from the voltage converter is maintained between an upper limit and a lower limit.

10. The system of claim 9, wherein the lower limit is no less than about 30 V and the upper limit is no more than about 50 V.

11. The system of claim 10, wherein the lower limit is about 34 V and the upper limit is about 44 V.

12. A system for powering an electrical device operating on current peaks in a vehicle having a battery, the system comprising:

a voltage converter configured to be coupled to the battery of the vehicle;

an electrical device configured to be located in the vehicle and configured to receive power from the voltage converter;

wherein the voltage converter is current-regulated.

13. The system of claim 12, wherein the electrical device is a vehicle headlight.

14. The system of claim 12, further comprising a capacitive element connecting the electrical device and the voltage regulator.

15. The system of claim 12, wherein the electrical device is an electromagnetic actuator.

16. The system of claim 15, wherein the electromagnetic valve actuator is configured to actuate an engine valve.

17. The system of claim 12, wherein the voltage output from the voltage converter is maintained between an upper limit and a lower limit.

18. The system of claim 17, wherein the lower limit is no less than about 30 V and the upper limit is no more than about 50 V.

19. The system of claim 18, wherein the lower limit is about 34 V and the upper limit is about 44 V.

20. The system of claim 12, wherein the voltage converter is current-regulated from a reference current.

21. The system of claim 20, wherein the reference current corresponds to a mean current between two peaks.

22. The system of claim 20, wherein the reference current is evaluated in a predictive manner.

23. The system of claim 22, wherein data corresponding to engine speed is used to evaluate the reference current in the predictive manner.

24. The system of claim 20, wherein the reference current corresponds to an average amount of electricity consumed by one or more electrical devices receiving power from the voltage converter.

25. The system of claim 24, wherein the reference current includes a correction factor.

26. The system of claim 25, wherein the correction factor is about 10% of the average amount of electricity consumed.

* * * * *